United States Patent [19]
Mitsuno et al.

[11] Patent Number: 4,946,896
[45] Date of Patent: Aug. 7, 1990

[54] THERMOPLASTIC ELASTOMER COMPOSITION

[75] Inventors: Tatsuyuki Mitsuno; Hideo Shinonaga; Akio Daimon, all of Chiba, Japan

[73] Assignee: Sumitomo Chemical Company, Ltd., Osaka, Japan

[21] Appl. No.: 265,845

[22] Filed: Nov. 1, 1988

Related U.S. Application Data

[63] Continuation-in-part of Ser. No. 46,939, May 5, 1987, abandoned.

[30] Foreign Application Priority Data

May 8, 1986 [JP] Japan ................................ 61-105667

[51] Int. Cl.$^5$ ................... C08L 23/10; C08L 23/16; C08L 23/26; C08L 33/04
[52] U.S. Cl. ................................ 525/93; 525/194; 525/207
[58] Field of Search ..................... 525/207, 93, 194

[56] References Cited

U.S. PATENT DOCUMENTS

| | | | |
|---|---|---|---|
| 4,387,186 | 6/1983 | Statz | 524/494 |
| 4,619,969 | 10/1986 | Doi et al. | 525/93 |
| 4,686,257 | 8/1987 | Mitsuno et al. | 524/449 |

FOREIGN PATENT DOCUMENTS

| | | |
|---|---|---|
| 0058980 | 9/1982 | European Pat. Off. |
| 0184321 | 6/1986 | European Pat. Off. |
| 0213720 | 3/1987 | European Pat. Off. |
| 8604912 | 8/1986 | World Int. Prop. O. |

*Primary Examiner*—Carman J. Seccuro
*Attorney, Agent, or Firm*—Cushman, Darby & Cushman

[57] ABSTRACT

There is provided a thermoplastic elastomer composition having excellent surface processabilities such as adhesion, paintability and printability together with impact resistance. This composition comprises (A) 20–80% by weight of a polypropylene resin, (B) 5–38% by weight of an ethylene copolymer having 82–98.7 mol % of an ethylene unit, 1–15 mol % of an ester unit selected from alkyl acrylate and methacrylate having an alkyl group of 1–8 carbon atoms and 0.3–3 mol % of an unsaturated dicarboxylic acid anhydride unit and (C) 5–70% by weight of ethylene-propylene and/or ethylene-propylene-non-conjugated diene copolymer rubber which contain 50–85 mol % of an ethylene unit and have a Mooney viscosity at 100° C. of 20–100 and an iodine value of 20 or less.

11 Claims, No Drawings

THERMOPLASTIC ELASTOMER COMPOSITION

RELATED APPLICATIONS

This application is a continuation-in-part of U.S. Application Ser. No. 046,939 filed May 5, 1987, now abandoned.

BACKGROUND OF THE INVENTION

This invention relates to a thermoplastic elastomer composition.

Thermoplastic elastomers are known materials and recently their uses are being steadily increased including parts of automobiles, household appliances, etc. because of their low hardness and flexible properties and their moldability by the methods such as extrusion molding, injection molding, etc. like the conventional thermoplastic resins.

Especially, olefinic thermoplastic elastomers have low specific gravity, heat resistance and superior balance in properties in addition to the above properties and hence are in increased demand especially in the field of automobile parts also due to the trend of lightening of automobiles. Recently, they have been found to have their uses also in the field of injection molding of large articles such as bumpers of automobiles. There are movements to heighten fashionability by painting the surface of bumpers in the same colors as the bodies.

Furthermore, printing is often made on household appliances to increase decorative effects.

This invention relates to a thermoplastic elastomer composition capable of providing molded products improved in surface processabilities such as adhesiveness, paintability and printability together with impact resistance and heat resistance and contemplates use for parts of automobiles and household appliances as mentioned above.

Hitherto, compositions comprising olefinic copolymer rubbers or olefinic plastics have been well known as olefinic thermoplastic elastomers. However, owing to their non-polarity, in many cases, surface processing for improvement of adhesion, paintability, etc. are difficult.

In order to solve these problems, a medium called "primer", typical composition of which comprises halogenated polypropylene and toluene, is used as a layer between olefinic thermoplastic elastomer and adhesives and paint to further improve the compatibility therebetween.

However, due to expensiveness of the primer per se and addition of one extra step, the cost of final products increases and thus further improvement has been demanded.

For improvement of adhesion, modification of the surface of polypropylene molded products by physical or chemical etching has been studied and employed. However, the step of this method is more complex than the primer coating step and besides modification of the molded products may be caused depending on the etching conditions and improvement is insufficient.

For improvement of paintability, there has been employed a method of imparting polarity to the surface of molded products by irradiation with plasma in place of coating with primer. However, this method has not yet provided satisfactory results in that the plasma irradiation step is carried out in batch system and treatment becomes ununiform for molded products of some shapes.

SUMMARY OF THE INVENTION

Accordingly, one object of this invention is to provide a thermoplastic elastomer composition free of the above defects and remarkably superior in adhesion, paintability and printability.

Another object of this invention is to provide a molded product excellent in surface workability and mechanical characteristics which comprises said thermoplastic elastomer composition.

DESCRIPTION OF THE INVENTION

As a result of the inventors' intensive researches to attain the above objects, it has been found that a composition which comprises a polypropylene resin, an ethylene copolymer comprising an ethylene unit, an ester unit selected from an alkyl acrylate and an alkyl methacrylate and unsaturated dicarboxylic acid anhydride unit and an ethylene-propylene or ethylene-propylene-non-conjugated diene copolymer rubber is free from the above defects and is excellent in adhesion and paintability. Thus, this invention has been accomplished.

That is, this invention relates to a thermoplastic elastomer composition which comprises:

(A) 20–80% by weight of a polypropylene resin, (B) 5–38% by weight of an ethylene copolymer having 82–98.7 mol % of an ethylene unit, 1–15 mol % of an ester unit selected from an alkyl acrylate and alkyl methacrylate having an alkyl group of 1–8 carbon atoms and 0.3–3 mol % of an unsaturated dicarboxylic acid anhydride unit and (C) 5–70% by weight of an ethylene-propylene and/or ethylene-propylene-non-conjugated diene copolymer rubber containing 50–85 mol % of an ethylene unit and having a Mooney viscosity ($ML_{1+4}$ 100° C.) of 20–100 and an iodine value of 20 or less.

Construction of this invention is specifically explained below.

(A) Polypropylene Resins

As the polypropylene resins, there may be used, alone or in combination of two or more, crystalline polypropylenes, crystalline polypropyleneethylene block or random copolymers, crystalline poly-propylene-α-olefin copolymers (carbon number of the α-olefin is 4–10), etc.

Melt index (according to JIS K6758) of said polypropylene resins is generally 0.5–100, preferably 1–50.

(B) Ethylene Copolymer

The ethylene copolymers used in this invention are those which comprise 82–98.7 mol % of an ethylene unit, 1–15 mol % of an ester unit selected from alkyl acrylate and alkyl methacrylate having 1–8 carbon atoms and 0.3–3 mol % of an unsaturated dicarboxylic acid anhydride unit.

As examples of monomers having ester unit contained in the ethylene copolymers, mention may be made of methyl acrylate, ethyl acrylate, butyl acrylate, methyl methacrylate, ethyl methacrylate, 2-ethylhexyl methacrylate, butyl methacrylate, etc. (which are called "unsaturated ester compounds" hereinafter).

Amount of the ester unit contained in the ethylene copolymers is generally 1–15 mol %, preferably 3–12 mol %. When the amount is outside this range, the resulting thermoplastic elastomer composition is inferior in compatibility with polypropylene resins or is poor in improvement in mechanical characteristics such as impact value, etc.

As examples of monomers having unsaturated dicarboxylic acid anhydride unit, mention may be made of maleic anhydride, citraconic anhydride, itaconic anhydride, tetrahydrophthalic anhydride, etc. and especially preferred is maleic anhydride.

Amount of the unsaturated dicarboxylic acid anhydride in the ethylene copolymer is generally 0.3–3 mol %, preferably 0.5–2.8 mol %. If less than the lower limit, polar groups which participate in the surface processing are deficient, giving insufficient improvement and when more than the upper limit, the polarity is too strong and the ethylene copolymer becomes non-compatible with polypropylene resins.

Method for production of the ethylene copolymers has no special limitation and there may be employed the known methods such as solution polymerization, emulsion polymerization, high-pressure bulk polymerization, etc. The most commonly used is a high-pressure polymerization method which carries out copolymerization with ethylene in the presence of a radical forming agent under 500–3,000 atm. and at 100–300° C. in the presence or absence of a suitable solvent or chain transfer agent. According to such high-pressure polymerization method, it is suitable to subject a solution of said unsaturated dicarboxylic acid anhydride in said unsaturated ester compound to pressurizing it by a high-pressure pump and directly introduce it into a tank-like or tubular reactor. Melt index (according to JIS K6760) of thus obtained ethylene copolymers is suitably 0.5–300, preferably 1–200.

When the melt index is less than the lower limit, the ethylene copolymer is inferior in compatibility with polypropylene resins and when more than the upper limit, the resulting thermoplastic elastomer composition is inferior in heat resistance and surface hardness.

(C) Ethylene-propylene Copolymer Rubber and Ethylene-propylene-non-conjugated Diene Copolymer Rubber.

The ethylene-propylene copolymer rubber and/or ethylene-propylene-non-conjugated diene copolymer rubber used in this invention contain 50–85 mol % of an ethylene unit and have a Mooney viscosity ($ML_{1+4}$ 100° C.) of 20–100 and an iodine value of 20 or less.

The ethylene-propylene copolymer rubber and/or ethylene-propylene-non-conjugated diene copolymer rubber may be partially crosslinked with an organic peroxide.

Said organic peroxides include 2,5-dimethyl 2,5-di(t-butylperoxy)hexane, 2,5-dimethyl 2,5-di(t-butylperoxy)hexyne-3,1,3-bis(t-butylperoxyisopropyl)benzene, 1,1-di(t-butylperoxy)3,5,5-trimethylcyclohexane, 2,5-dimethyl 2,5-di(peroxybenzoyl)hexyne-3 and dicumyl peroxide, etc.

If necessary, crosslinking aids such as bismaleimide compounds, divinyl benzene, etc. may further added and mixed.

When the ethylene unit is less than 50 mol %, impact strength decreases and in the case of partially crosslinked rubber, decomposition with the organic peroxide proceeds too much, causing reduction of mechanical properties and bad appearance of molded products. When ethylene content is more than 85 mol %, the copolymer rubber becomes crystalline to result in reduction of impact resistance.

When the Mooney viscosity at 100° C. ($ML_{1+4}$ 100° C.) is less than 20, mechanical properties are inferior and when more than 100, fluidity is poor and appearance of injection molded products becomes inferior. Preferred range is 30–90.

When iodine value is more than 20, this is economically not advantageous and in the case of partially crosslinked copolymer rubber, crosslinking with the organic peroxide proceeds too much and stones often occur.

As the non-conjugated dienes, mention may be made of, for example, methyltetrahydroindene, 5-vinylnorbornene, 5-ethylidene-2-norbornene, dicyclopentadiene, 1,4-hexadiene, 1,6-octadiene, etc.

The present invention is limited to the use of ethylene-propylene copolymer rubber and ethylene-propylene-non-conjugated diene copolymer rubber. The other styrene elastomers such as styrene-butadiene block copolymer and hydrogenation products thereof are not desirable.

(D) Compositional Proportions

The proportion of the ethylene copolymer which is component (B) in the thermoplastic elastomer composition of this invention is 5–38% by weight, especially 10–20% by weight.

When the proportion of the ethylene copolymer (B) is less than 5% by weight, there are recognized substantially no effects of improvements in surface processabilities such as adhesion, paintability and printability and when more than 38% by weight, properties of the resulting compositions such as stiffness, heat resistance, etc. become inferior and no gain effects are seen in improvement of surface processability.

The proportion of the ethylene-propylene copolymer rubber and/or ethylene-propylene-nonconjugated diene copolymer rubber which are component (C) in the thermoplastic elastomer composition of this invention is 5–70% by weight, especially 10–70% by weight. When less than 5% by weight, mechanical properties such as impact strength are inferior and when more than 70% by weight, thermoplastic properties are developed with difficulty.

(E) Mixing Method and Molding Method

In preparation of the thermoplastic elastomer composition of this invention, there may be additionally incorporated, within the range not to substantially damage the characteristics of the composition, various styrene elastomers such as styrene-butadiene random copolymer, styrene-butadiene block copolymer and its hydrogenated product, etc., various polyolefin elastomers such as non-crystalline ethylene-propylene copolymer, ethylene-propylene-dicyclopentadiene copolymer, etc., and various functional group-containing polyolefins such as maleic anhydride graft modified polypropylene, glycidyl group-containing ethylene copolymer, etc.

Furthermore, if necessary, there may also be added process oils such as paraffinic oils, aromatic oils, naphthenic oils, etc. for improvement of softening property, extendability and processability of the rubbers.

Moreover, various additives such as antioxidant, weathering agent, antistatic agent, foaming agent, colorant, etc. may also be added in a suitable amount.

The composition of this invention is obtained by uniformly mixing the above components in predetermined mixing ratios. The uniform mixing can be carried out by mechanical melt kneading with common kneaders for thermoplastic resins. The kneaders used include singlescrew extruder, twin-screw extruder, Banbury mixer, twin roll, etc. The mixing operation of the components may be carried out simultaneously or dividedly.

(F) Characteristics and Uses

The thermoplastic elastomer compositions of this invention possess excellent adhesion, paintability and printability with maintaining mechanical strength, heat resistance, impact strength, surface gloss, appearance, weather resistance similar to or better than those of olefinic thermoplastic elastomers.

The thermoplastic elastomer compositions according to this invention exhibit the excellent effects as mentioned above and hence can be utilized in the fields where adhesion, painting and printing are required.

The composition according to this invention can be molded by generally employed molding machines for thermoplastic resins and by the methods used for molding of thermoplastic resins such as injection molding, extrusion molding, blow molding, calender molding, etc.

Typical examples of uses are enumerated below:

(1) Exterior trims of automobiles such as soft bumpers, corner bumpers, side shields, overriders, bumper moles, side moles, etc.

(2) Interior trims of automobiles such as ceiling sheets, seat belt covers, interior mats, etc.

(3) Various hose parts of household appliances (washing machines, bedclothes drier)

The following nonlimiting examples and comparative examples further explain this invention.

(1) Preparation of ethylene copolymer sample:

Ethylene containing a small amount of propane as a chain transfer agent and a solution prepared by dissolving maleic anhydride in various unsaturated ester compounds shown in Table 1 are continuously fed under pressure to a 1.2 l reactor equipped with a stirrer and copolymerization was carried out under a pressure of 1,600 kg/cm² and at a rate of 1.5–3.2 kg/hr with controlling the polymerization temperature to 180° C. to obtain the following various samples.

TABLE 1

| | Various ethylene copolymer samples | | | |
|---|---|---|---|---|
| | Content of comonomer (mol %) | | | Melt index |
| Samples | Maleic anhydride | Unsaturated ester compound | | g/10 min 190° C. |
| a | 1.22 | Butyl acrylate | 5.34 | 150 |
| b | 1.10 | 2-Ethylhexyl methacrylate | 2.81 | 5 |
| c | 2.21 | Ethyl acrylate | 7.52 | 41 |
| d | 1.95 | Methyl methacrylate | 14.4 | 24 |

(2) Method for measurement of properties

A plate of 150 mm × 90 mm × 2 mm was made by molding by screw in-line type injection molding machine (3.5 ounces) manufactured by Nissei Jushi Kogyo Co. and this was used as a test piece for measurement of initial adhesion degree of coating and adhesion strength-1 referred to below.

1. Initial adhesion degree of coating: The same plate as prepared hereinabove was subjected to surface cleaning in 1,1,1-trichloroethane vapor (74° C.) for 30 seconds and dried at room temperature and thereafter, directly spray coated with an urethane paint (Flexthane #101 manufactured by Nippon Bee Chemical Co.) and baked in an oven of 120° C. for 30 minutes.

Thus formed film of the above sample was cut lengthwise and crosswise by a razor to form one hundred squares (10×10) of 2 mm ×2 mm and thereon was applied adhesive tape (manufactured by Nichiban Co.) of 24 mm wide under pressure by fingers. Then, the tape was rapidly peeled off by taking one end of the tape and the number of the squares left on the plate was counted and was taken as percentage of retention (%) for evaluation.

2. Adhesion Strength (i) Adhesion Strength - 1

The same plate as used for the initial adhesion 1 was coated with about 150 g/m² of a mixture of 97% by weight of G250 manufactured by Cemedine Co. and 3% by weight of Desmodur as an adhesive by an air spray gun and heated at 80° C. for 2 minutes. Thereto was allowed to adhere PPX manufactured by Toray Industries Inc. heated at 110° C. for 2 minutes as a surface skin under a pressure of 0.2 kg/cm². This was left to stand in an atmosphere of 23° C. and 65±5% RH for 7 days and then, subjected to 180° peeling test to measure the strength.

(ii) Adhesion Strength - 2

Using the above screw in-line type injection molding machine of Nissei Jushi Kogyo Co., a sample was made by inserting a metal plate of 2 mm thick into a mold of 4 mm thick at a molding temperature of 220° C. and under an injection pressure of 650 kg/cm² and this sample was used for test. The adhesion strength was 180° peeling strength measured at 23° C. and at a speed of 50 mm/min.

3. Hardness (Shore A)

Shore A hardness was measured at 23° C. according to ASTM D2240.

4. Izod impact strength: This was measured at −40° C. according to JIS K7110. The test piece for the measurement was made by molding using a screw inline type injection molding machine (10 ounces) manufactured by Sumitomo Heavy Industries Ltd.

EXAMPLE 1

A mixture of Sumitomo Noblen® AW564 as a polypropylene resin, an ethylene copolymer C (as shown in Table 1) and an ethylene-propylene copolymer rubber (called EPR-1) having a Mooney viscosity of 90 at 100° C. and an ethylene content of 69 wt% in the proportion as shown in Table 2 and 0.05 wt part (based on 100 wt parts of said mixture) of Irganox® 1010 (manufactured by Ciba Geigy Co.) were melt kneaded by Banbury mixer at 180° C. for 5 minutes. Thus obtained elastomer composition was subjected to the evaluation tests.

EXAMPLE 2

A mixture of Sumitomo Noblen® AW564 and an ethylene-propylene copolymer rubber (called EPDM-1) having a Mooney viscosity of 86 at 100° C, an ethylene content of 50 wt% and an iodine value of 10 in the proportion as shown in Table 2 and 0.4 wt part (based on 100 wt parts of said mixture) of 1,3-bis(t-butylperoxyisopropyl)benzene as a crosslinking agent were melt kneaded by a Banbury mixer at 180° C. for 5 minutes. To thus obtained elastomer composition was further added the ethylene copolymer C at the proportion as shown in Table 2 and these were again kneaded by a Banbury mixer. Thus obtained final elastomer composition was subjected to the evaluation tests.

EXAMPLES 3-6 AND COMPARATIVE EXAMPLES 1-4

Examples 1 and 2 were repeated except that kinds and amounts of ethylene copolymer were changed as shown in Table 2 and thus obtained elastomer compositions were subjected to the evaluation tests.

Results of Examples 1-6 and Comparative Examples 1-4 are shown in Table 2.

COMPARATIVE EXAMPLE 5

Example 6 was repeated except that styrene-butadiene-styrene block copolymer, which is hereinafter referred to as SBS-1 was used in place of the ethylene-propylene copolymer rubber. The SBS-1 has an A-B-A structure, wherein A is polystyrene block moiety having 10,000 of number-average molecular weight and B is butadiene block moiety having 50,000 of number-average molecular weight. Evaluation test was made on the elastomer composition obtained. The results are shown in Table 2. The composition is inferior to that of Example 6 in respect to adhesion strength-1 and -2 and Izod impact strength.

COMPARATIVE EXAMPLE 6

Example 6 was repeated except that block copolymer of styrene-butadiene whose hydrogenation degree is 100%, which is hereinafter referred to as SEBS-1 was used in place of the ethylene-propylene copolymer rubber. The SEBS-1 has an A'-B'-A' structure, wherein A' is polystyrene block moiety having 15,000 of number-average molecular weight and B' is butadiene block moiety having 7,000 of number-average molecular weight, said butadiene having 100% of hydrogenation degree. Evaluation test was made on the elastomer composition obtained. The results are shown in Table 2. The composition is inferior to that of Example 6 in respect to initial adhesion degree of coating.

COMPARATIVE EXAMPLE 7

Example 1 was repeated except that no EPR-1 was employed and that Sumitomo Noblen® AW564 and ethylene copolymer C were used in amount of 80 parts by weight and 20 parts by weight, respectively. Evaluation test of the product obtained was made. The results are shown in Table 2. The product is greatly inferior to that of Example 6 where EPR-1 was added, with respect to Izod impact strength ($-40\,°$ C.).

As is clear from Table 2, the compositions of examples of this invention had superior balances of various properties to those of comparative examples which lacked the requirements of this invention.

As explained hereabove, this invention can provide thermoplastic elastomer compositions having excellent surface processabilities such as adhesion, paintability and printability together with high impact strength and molded products obtained therefrom.

TABLE 2

| | Polypropylene resins | | Ethylene copolymers | | Rubbers | | Initial adhesion degree of coating (%) | Adhesion strength -1 (g/inch) | Adhesion strength -2 (g/inch) (SUS/Al) | Hardness (Shore A) | Izod impact strength ($-40°$ C.) (kg-cm/cm) |
|---|---|---|---|---|---|---|---|---|---|---|---|
| | Samples | wt % | Samples | wt % | Samples | wt % | | | | | |
| Example 1 | AW564 | 30 | c | 25 | EPR-1 | 45 | 100 | 2800 | 1700/1600 | 85 | NB |
| Example 2 | AW564 | 25 | c | 25 | EPDM-1 | 50 | 100 | 3000 | 1200/1800 | 78 | NB |
| Example 3 | AW564 | 25 | d | 25 | EPDM-1 | 50 | 100 | 2600 | 1300/1500 | 80 | NB |
| Example 4 | AW564 | 25 | a | 25 | EPR-1 | 50 | 100 | 2300 | 1000/1200 | 73 | NB |
| Example 5 | AW564 | 25 | b | 25 | EPR-1 | 50 | 100 | 2100 | 900/1200 | 76 | NB |
| Example 6 | AW564 | 50 | c | 20 | EPR-1 | 30 | 100 | 2000 | 500/600 | 92 | NB |
| Comparative example 1 | AW564 | 100 | — | — | — | — | 0 | 1000 | 0/0 | 99 | 3 |
| Comparative example 2 | AW564 | 50 | — | — | EPR-1 | 50 | 0 | 1200 | 0/0 | 93 | NB |
| Comparative example 3 | AW564 | 50 | c | 3 | EPR-1 | 47 | 10 | 1200 | 0/0 | 92 | NB |
| Comparative example 4 | AW564 | 25 | c | 50 | EPR-1 | 25 | 100 | 2800 | 1500/1600 | 69 | 5 |
| Comparative example 5 | AW564 | 50 | c | 20 | SBS-1 | 30 | 100 | 1400 | 300/300 | 95 | 7 |
| Comparative example 6 | AW564 | 50 | c | 20 | SEBS-1 | 30 | 0 | 2100 | 600/700 | 95 | NB |
| Comparative example 7 | AW564 | 80 | c | 20 | — | — | 100 | 1400 | 600/700 | 96 | 3 |

We claim:

1. A thermoplastic elastomer composition which comprises (A) 20–80% by weight of a polypropylene resin, (B) 5–38% by weight of an ethylene copolymer having 82–98.7 mol % of an ethylene unit, 1–15 mol % of an ester unit selected from the group consisting of alkyl acrylate and alkyl methacrylate containing an alkyl group of 1–8 carbon atoms and 0.3–3 mol % of an unsaturated dicarboxylic acid anhydride unit and (C) 10–70% by weight of at least one of an ethylenepropylene copolymer rubber and an ethylene-propylene-nonconjugated diene copolymer rubber which contain 50–85 mol % of an ethylene unit and have a Mooney viscosity ($ML_{1+4}\,100°$ C.) of 20–100 and an iodine value of 20 or less.

2. A thermoplastic elastomer composition according to claim 1 wherein the polypropylene resin is at least one member selected from crystalline polypropylene, crystalline propylene-ethylene block and random copolymers and crystalline propylene-α-olefin copolymers.

3. A thermoplastic elastomer composition according to claim 1 wherein the polypropylene resin has a melt index (JIS K6758) of 0.5–100.

4. A thermoplastic elastomer composition according to claim 1 wherein the ester unit contained in the ethylene copolymer is a monomer selected from methyl acrylate, ethyl acrylate, butyl acrylate, methyl methacrylate, ethyl methacrylate, 2-ethylhexyl methacrylate and butyl methacrylate.

5. A thermoplastic elastomer composition according to claim 1 wherein the unsaturated dicarboxylic acid anhydride unit is a monomer selected from maleic anhydride, citraconic anhydride, itaconic anhydride and tetrahydrophthalic anhydride.

6. A thermoplastic elastomer composition according to claim 5 wherein the unsaturated dicarboxylic acid anhydride is maleic anhydride.

7. A thermoplastic elastomer composition according to claim 1 wherein the ethylene copolymer has a melt index (JIS K6760) of 0.5–300.

8. A thermoplastic elastomer composition according to claim 1 wherein the ethylene-propylene copolymer rubber and ethylene-propylene-non-conjugated diene copolymer rubber is crosslinked with an organic peroxide.

9. A thermoplastic elastomer composition according to claim 1 wherein the non-conjugated diene is selected from methyltetrahydroindene, 5-vinylnorbornene, 5-ethylidene-2-norbornene, dicyclopentadiene, 1,4-hexadiene and 1,6-octadiene.

10. A molded product prepared from the composition as defined in claim 1.

11. A molded product comprising a part for an automobile prepared from the composition as defined in claim 1.

* * * * *